H. Haynesworth,
Hand Plow.
No. 97,508.  Patented Dec. 7, 1869.
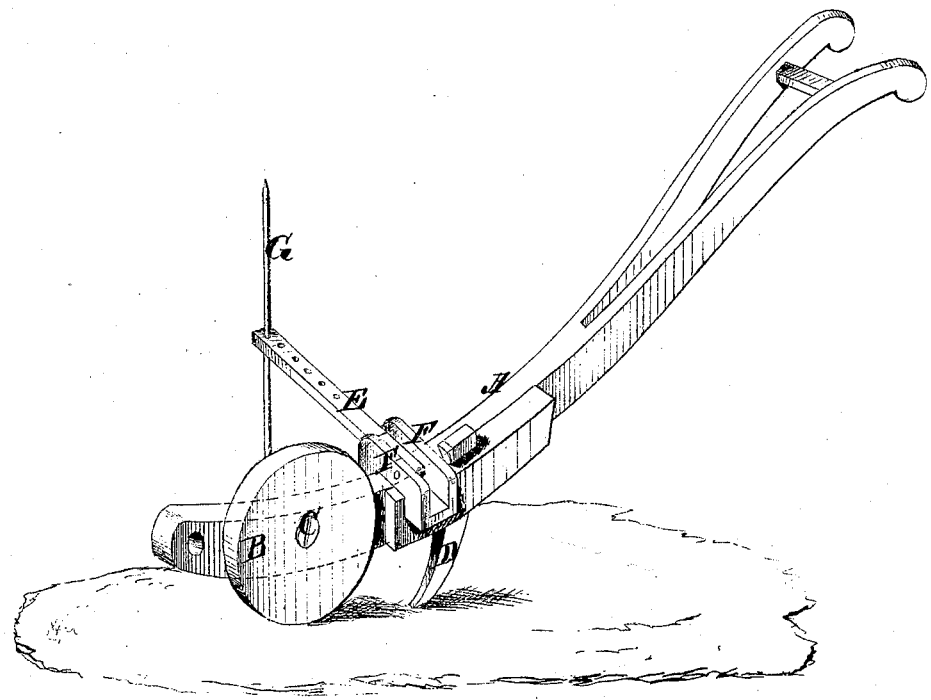
Witnesses:
Alex T. Roberts
Nott Brooks
Inventor:
H. Haynesworth
PER Munn & Co
Attorneys.

UNITED STATES PATENT OFFICE.

H. HAYNSWORTH, OF SUMTER, SOUTH CAROLINA.

IMPROVEMENT IN GARDEN PLOWS AND MARKERS.

Specification forming part of Letters Patent No. 97,508, dated December 7, 1869.

*To all whom it may concern:*

Be it known that I, HENRY HAYNSWORTH, of Sumter, in the district of Sumter and State of South Carolina, have invented a new and Improved Garden Plow and Marker; and I do hereby declare that the following is a full, clear, and exact description thereof, which will enable others skilled in the art to make and use the same, reference being had to the accompanying drawing, forming part of this specification.

This invention relates to improvements in hand garden-plows for making and marking furrows and drills for planting, and for plowing between rows of plants for cultivating.

It consists of a curved and forked beam, answering for beam and handles, a wheel at the front end of the beam for supporting it, a plow or scraper behind the wheel, and a marker-supporting arm hinged to the beam, so as to project laterally therefrom, and to be turned to either side for marking the next row by a marking-rod, supported at a suitable distance from the beam, all as hereinafter specified.

The drawing represents a perspective view of my improved plow.

A is a curved beam of wood of any size and length, as required. It is forked at the upper end and shaped into handles. The other end is curved, so as to rise from a point in rear thereof above a horizontal line when the handles are held in the hands by the operator.

B is a small roller, connected to the beam by a stud-pin, C, at the front end, for rolling along the ground. A number of holes is provided in the front end of the plow-beam, and the pin C is adjustable from one to the other, so that the part of the beam which supports the plow D may be higher or lower, according to the depth it is required to make the furrow. The said plow may be of any shape or size. As the beam is pushed along before the operator on the wheel B, the plow, projecting into the ground, makes the furrow.

E is a marker-carrying arm. It is pivoted to the top of the beam, so as to project laterally, and may be turned to either side.

F represents supports attached to the beam across the top, one on each side of the arm E, for bracing it laterally.

G is the marker, consisting of a rod arranged vertically in the arm E, so that it will make a mark in the ground at the side of the plow when the latter is pushed along. The arm is provided with a number of holes between the joint with the beam and the end, for changing the marker to mark for wide or narrow rows.

This implement may be made wholly of wood, or all of wood except the plow, and may be very light for use in gardens, either for marking the rows and making drills or for weeding between the rows of young plants.

Having thus described my invention, I claim as new and desire to secure by Letters Patent—

The herein-described improved garden plow and marker, consisting of the beam A, wheel B, plow D, arm E, and marker G, all combined and arranged substantially as specified.

H. HAYNSWORTH.

Witnesses:
I. F. W. DE LORME,
WM. M. DE LORME.